(12) United States Patent
Oh et al.

(10) Patent No.: US 7,551,673 B1
(45) Date of Patent: Jun. 23, 2009

(54) ADAPTIVE MOTION ESTIMATOR

(75) Inventors: Hong Lye Oh, Singapore (SG); Yau Wai Lucas Hui, Singapore (SG)

(73) Assignee: STMicroelectronics Asia Pacific Pte Ltd., Singapore (SG)

( * ) Notice: Subject to any disclaimer, the term of this patent is extended or adjusted under 35 U.S.C. 154(b) by 0 days.

(21) Appl. No.: 09/980,443

(22) PCT Filed: May 13, 1999

(86) PCT No.: PCT/SG99/00041

§ 371 (c)(1),
(2), (4) Date: Aug. 8, 2002

(87) PCT Pub. No.: WO00/70879

PCT Pub. Date: Nov. 23, 2000

(51) Int. Cl.
*H04B 1/66* (2006.01)
*H04N 7/12* (2006.01)
*H04N 11/02* (2006.01)
*H04N 11/04* (2006.01)

(52) U.S. Cl. .............................. 375/240.16; 348/413.1; 348/416.1

(58) Field of Classification Search ............ 375/240.16, 375/240.15
See application file for complete search history.

(56) References Cited

U.S. PATENT DOCUMENTS

| | | | | |
|---|---|---|---|---|
| 4,862,260 A | * | 8/1989 | Harradine et al. | 348/699 |
| 5,006,929 A | * | 4/1991 | Barbero et al. | 375/240.24 |
| 5,067,014 A | * | 11/1991 | Bergen et al. | 382/107 |
| 5,093,720 A | * | 3/1992 | Krause et al. | 348/452 |
| 5,237,405 A | * | 8/1993 | Egusa et al. | 348/208.1 |
| 5,428,396 A | * | 6/1995 | Yagasaki et al. | 375/240.16 |
| 5,473,379 A | * | 12/1995 | Horne | 375/240.16 |
| 5,557,684 A | * | 9/1996 | Wang et al. | 382/107 |
| 5,764,803 A | * | 6/1998 | Jacquin et al. | 382/236 |
| 6,058,143 A | * | 5/2000 | Golin | 375/240.16 |

(Continued)

FOREIGN PATENT DOCUMENTS

EP 0468297 A 1/1992

(Continued)

OTHER PUBLICATIONS

Makhoul et al., Vector Quantization in Speech Coding (VQSC), Nov. 1985, IEEE, Proceedings of the IEEE, vol. 73 No. 11, pp. 1557, 1579.*

(Continued)

*Primary Examiner*—Mehrdad Dastouri
*Assistant Examiner*—Jeremaiah C Huber
(74) *Attorney, Agent, or Firm*—Lisa K. Jorgenson; David V. Carlson

(57) ABSTRACT

A method and apparatus of encoding digital video according to the ISO/IEC MPEG standards (ISO/IEC 11172-2 MPEG-1 and ISO/IEC 13818-2 MPEG-2) using an adaptive motion estimator. A plurality of global motion vectors are derived from the motion vectors of a previous picture in a sequence, and the global motion vectors are analyzed to determine motion characteristics. The video encoding is arranged to enable switching among different types of local motion estimators based on the motion characteristics of the moving pictures sequence. This gives rise to a motion estimation algorithm that can adaptively change its search range, search area and block matching scheme to suit different types of moving sequences.

9 Claims, 6 Drawing Sheets

U.S. PATENT DOCUMENTS

| | | | |
|---|---|---|---|
| 6,249,550 B1 * | 6/2001 | Mizuno et al. | 375/240.24 |
| 6,370,194 B2 * | 4/2002 | Nishikawa | 375/240.16 |
| 6,456,660 B1 * | 9/2002 | Yokoyama | 375/240.16 |
| 6,600,786 B1 * | 7/2003 | Prakash et al. | 375/240.25 |

FOREIGN PATENT DOCUMENTS

| | | |
|---|---|---|
| EP | 0831642 A2 | 3/1998 |
| JP | 10-191347 | 7/1998 |
| WO | WO 95/30310 | 11/1995 |
| WO | WO 98/43434 | 10/1998 |

OTHER PUBLICATIONS

Hang et al., "Motion Estimator for Video Coding Standards," *Journal of VLSI Signal Processing 17* (Feb. 2003): 113-136, 1997.

Ziegler, "Hierarchical Motion Estimation Using the Phase Correlation Method in 140 MBit/S HDTV-Coding," *Proceedings of the Third International Workshop on HDTV*: 131-137, 1990.

* cited by examiner

ADAPTIVE MOTION ESTIMATOR

FIELD OF THE INVENTION

The present invention relates to a method and apparatus for encoding moving pictures sequences. In particular, the present invention relates to a method and apparatus for motion estimation and motion compensation in a video signal compression system.

BACKGROUND OF THE INVENTION

Methods for encoding moving pictures or video such as the MPEG1, MPEG2, H.261, and H.263 standards have been developed for efficient data transmission and storage. A detailed description of one such encoding method is found in MPEG2 Test Model 5, ISO/IEC JTC1/SC29/WG11/N0400, April 1993, and the disclosure of that document is hereby expressly incorporated herein by reference. In the described encoding method, an input video sequence is organized into a sequence layer, group-of-pictures (GOP), pictures, slices, macroblocks, and finally block layer. Each picture is coded according to its determined picture coding type. The picture coding types used include intra-coded picture (I-picture), predictive-coded picture (P-picture), and bi-directionally predictive-coded picture (B-picture).

Motion estimation/compensation, transform coding, and statistical coding are utilized to efficiently compress the input video sequence. For example in MPEG2 Test Model 5, each picture from the input video sequence is partitioned into rows of smaller and non-overlapping macroblocks of picture elements (pixels). Macroblocks in each row may be grouped into one or more slices. The compression is performed on each macroblock on a row-by-row basis starting from the leftmost macroblock to the rightmost macroblock, and the top row to the bottom row.

In the motion estimation/compensation method, motion vectors are detected for each macroblock in a picture. The coding mode for a macroblock (e.g. intra-coded, forward-predicted, backward-predicted, or interpolated) is decided based on the detected motion vectors and the determined picture coding type. The utilized motion vectors are differentially coded with variable length codes before outputting.

A typical motion vector detection process comprises determining, for each macroblock to be coded, a search window consisting of pixels from a reference picture and matching pixel values of the macroblocks to blocks of pixel values obtained from the search window. This process is known to be computationally intensive. Particularly, the size of the search window has a direct impact to the computation load.

Many methods of matching the pixel blocks are available, such as an exhaustive search method which compares every definable block within the search window, a logarithmic search method, a hierarchial search, and various other possible derivations. Depending on application requirements, a search method may be selected based on its performance in terms of accuracy and computation complexity.

To cater for sequences with large object movements between pictures, methods exist to increase the search range without enlarging the search window. These methods typically incorporate some form of prediction into the motion vectors, based on certain assumptions, to provide greater accuracy motion vectors for picture sequences with large movements without a large increase in computation load. One such method is the telescopic search method in which the motion vectors of macroblocks from a previously coded or matched picture are used to generate a new search window for each current macroblock. The telescopic search method comprises the steps of obtaining a motion vector from a co-sited macroblock from a closest coded picture; optional scaling of the obtained motion vector according to the picture distances between the reference picture, the closest coded picture, and the current picture; and defining the search window based on the centre position of the current macroblock plus an offset defined by the scaled motion vector.

Alternate methods of determining search windows are disclosed in U.S. Pat. Nos. 5,473,379 and 5,657,087, for example. The methods disclosed therein comprise the steps of calculating a global motion vector based on the motion vectors of a previous picture, and offsetting search windows of all macroblocks by the calculated global motion vector. The global motion vector may be determined by the mean or the median function, or by the most common motion vector of the previous picture; it can be further normalized according to the picture distances. The calculated global motion vector may then represent a global translational motion of objects from one picture to the other.

There are also hybrid motion estimators which combine both full search and hierarchical search to take advantage of the accuracy of full search and wide coverage of hierarchical search under a certain hardware limitation. For example, U.S. Pat. No. 5,731,850 discloses a system in which either full search or hierarchical search is chosen based on the search range imposed on various picture types. A full search is chosen if the search range assigned to that picture is below a certain threshold, else a hierarchical search is chosen.

Current arts use a fixed search range and one set of search windows for the various picture types in encoding a moving sequence, which fails to address the problem of varying motion characteristics within a moving sequence. A sequence may consist of segments with different characteristics: one segment may consist of slow moving objects with stationary background, another may consist of fast moving objects with stationary background, yet another with fast moving objects and background, and many other combinations. With such complex motion characteristics, having a fixed search range for individual picture types is inefficient as it over services during the slow moving segments while under servicing fast moving segments. This results in non-uniform motion estimator performance and inefficient bit allocation to coding the motion vectors. All these factors will lower the general performance of the encoder and also result in non-uniform output bitstreams quality.

Motion estimators of the type disclosed in U.S. Pat. No. 5,731,850 can use a hybrid of full search and hierarchical search to take advantage of the accuracy of full search and wide coverage of hierarchical search, but the search range is still pre-assigned and does not take account of the possible different motion characteristics of a moving sequence. Thus, this form of motion estimator will not have a good adaptability to moving sequences with large motion variances. The motion estimator therein disclosed is more concerned in offering trade-off in accuracy and wide coverage given a certain hardware limitation and a pre-assigned search range.

Methods utilising the global motion vector such as disclosed in the aforementioned U.S. Pat. Nos. 5,473,379 and 5,657,087 may be used to minimise search window cache size as well as the bandwidth requirement from the frame memory while expanding the actual search range. These methods fix the offset of the search window for all macroblocks in a picture. However, given that only one global motion vector is used for the offset of all search windows in a picture, the search range expansion works well only with pictures containing uniform translational motion. Pictures with zooming, rotational motion. sheering effects and pictures with more than one group of translational motions are not well exploited.

SUMMARY OF THE INVENTION

In accordance with the present invention, there is provided a method for improved data block matching in a moving pictures encoder for encoding a sequence of pictures each comprising a plurality of data blocks, comprising the steps of:
processing at least a picture in the sequence to obtain block motion vectors for the data blocks therein with respect to a reference picture;
generating a plurality of global motion vectors for the picture, each global motion vector being generated from a plurality of block motion vectors from a respective group of related blocks in the picture;
analysing the global motion vectors to determine a metric representing a distribution pattern thereof;
selecting a motion estimation scheme from amongst a plurality of motion estimation schemes, for data block matching of at least one subsequent picture in the sequence; and
performing data block matching of at least one subsequent picture in the sequence using the selected motion estimation scheme, said global motion vectors and preselected search window characteristics.

The present invention also provides a moving pictures encoder for encoding a sequence of pictures each comprising a plurality of data blocks, including an adaptive data block matching apparatus comprising:
a global motion estimator coupled to receive block motion vectors for data blocks of a previously processed picture with respect to a reference picture for generating a plurality of global motion vectors for the picture, each global motion vector being generated from a plurality of block motion vectors from a respective group of related blocks in the picture;
a motion characteristics analyser coupled to receive the global motion vectors from the global motion estimator for analysing the global motion vectors to determine a metric representing a distribution pattern thereof;
a selector coupled to receive the distribution pattern metric from the motion characteristics analyser for selecting a motion estimation scheme from amongst a plurality of motion estimation schemes, for data block matching of at least one subsequent picture in the sequence; and
a plurality of motion estimators controlled by said selector and coupled to receive said global motion vectors for performing data block matching of at least one subsequent picture in the sequence using the selected motion estimation scheme, said global motion vectors and preselected search window characteristics.

The present invention also provides a method for encoding moving pictures data from a sequence of moving pictures in which each picture in the sequence is represented by a plurality of data blocks corresponding to non-overlapping areas of the picture, the method comprising:
selecting a group of related data blocks from the plurality of data blocks of a picture;
for each data block in the selected group, obtaining a corresponding block motion vector from a previously processed picture in the moving pictures sequence;
determining a plurality of global motion vectors for the selected group, each of the global motion vectors being formed from a plurality of the corresponding block motion vectors;
analysing the global motion vectors and determining a metric representing a distribution pattern thereof;
selecting a motion estimator scheme on the basis of the distribution pattern metric, the motion estimator scheme being selected from amongst a plurality of motion estimator schemes each having a different combination of search strategy and number of global motion vectors;
performing data block-matching with a reference picture using the selected motion estimator scheme to generate a block motion vector; and
encoding the picture data including the block motion vectors.

The present invention further provides a method for motion estimation for use in encoding a picture in a moving pictures sequence wherein data representing the picture in the sequence comprises a plurality of data blocks, the method comprising the steps of:
selecting a group of related data blocks from the plurality of data blocks of the picture;
for each data block in the selected group, obtaining a corresponding block motion vector from a previously processed picture in the moving pictures sequence;
determining a primary global motion vector for the selected group from all of the corresponding block motion vectors;
classifying the block motion vectors from the selected group into a plurality of sub-groups;
determining a plurality of secondary global motion vectors corresponding to the respective sub-groups from the block motion vectors classified in the respective sub-groups; and
selecting the primary and/or at least one of the secondary global motion vectors for use in defining one or more search windows for each block in the selected group to enable block matching with a reference picture.

Embodiments of the present invention aim to provide:
an improved moving sequence encoding method and apparatus containing a motion estimator which can adaptively determine the motion estimation scheme best suited to the moving sequence based on the motion characteristics;
an improved moving sequence encoding method or apparatus containing a motion estimator which can adaptively adjust the search range on the fly to suit the motion characteristics of the moving sequence; and
an improved moving sequence encoding method or apparatus containing a global motion estimator with expanded search range and multiple search windows.

A preferred form of the present invention utilises a controller to determine which motion estimator to use, based on the motion characteristics of the moving sequence to achieve best output quality under a certain hardware limitation. The types of motion estimator which can be utilised are various form of global motion estimators that utilise techniques such as full search, hierarchical search, telescopic search and group motion vectors prediction. The term "group" in this context refers to a plurality of macroblocks, for example slice(s), row(s), half-row etc. The term "motion characteristics" here refers, without limitation, to size of motion vectors, distribution pattern of motion vectors, statistical data of motion vectors belonging to each group and relationships between global motion vectors representing each of these groups. With such a scheme, the search range used can be according to the motion characteristics of the moving sequence, for example large search range for fast motion and small search range for slow moving sequence, this will lead to a better allocation of bits between motion vectors and DCT coding.

An embodiment of the present invention utilises a global motion estimator which determines one or more global motion vectors that best represent one or more groups of MBs in a picture to be coded. The global motion estimator may determine the global motion vectors based on detected motion vectors from the corresponding group of MBs of a previously processed or coded picture. Each determined global motion vector provides an offset to all search windows for all MBs in the group. The global motion vectors better adapt to motion variation within a picture and expand the effective search range of the motion estimator without increasing the search window size. Having more than one global motion vector enables cases of varying clusters of motion within a group to be covered. Of course, more global motion vectors per group implies increased computation requirements if a similar search window size is maintained, or a reduction in search window size if the same computational restrictions are maintained.

With the determined set of global motion vectors for a picture, a maximum offset vector can be computed. The maximum offset vector is preferably the maximum of absolute values of the horizontal and vertical components from the set of global motion vectors. Combining maximum offset vector and the search window size, a maximum possible motion vector size can be determined and therefore the corresponding Variable Length Coding (VLC) tables can be selected for coding of motion vectors for the picture. Combining this with the ability to adaptively change the search range/area according to different motion characteristics, the VLC tables selected will be optimised for the types of motion in the picture and this optimises the efficiency of the motion vector coding.

BRIEF DESCRIPTION OF THE DRAWINGS

The invention is described in greater detail hereinafter, by way of example only, through description of preferred embodiments thereof and with reference to the accompanying drawings in which.

DETAILED DESCRIPTION OF THE PREFERRED EMBODIMENTS

A picture sequence encoder according to a preferred embodiment of the present invention encodes each input picture by determining its picture coding type (I-, P-, B-picture), obtaining MBs from the picture, subjecting MBs of P-picture or B-picture to a motion vector detection process (frame and/or field, forward and/or backward) using a global motion estimator, performing necessary motion compensation (predicted or interpolated) using the detected motion vectors, and subjecting all MBs to a transform coder followed by a statistical coder. The motion characteristics of past pictures are then collected and input into a controller to determine the type of motion estimator to be used for subsequent pictures.

The global motion estimator is updated with MB motion vectors from the past processed pictures by the adaptive motion estimator. The preceding pictures motion vectors are used to generate one or more global motion vectors for each group of MBs in a new picture to be coded based on the type of global motion estimator selected. Generated global motion vectors are used to offset search windows of all MBs in the corresponding group of MBs. For the case of more than one global motion vector, a comparison at MB level is done and the global motion vector that gives the best result is chosen.

At the end of a picture, a maximum offset vector is determined from all local motion vectors of the picture. The maximum offset vector is combined with the maximum search window size to select the VLC tables for coding of motion vectors for the picture.

At the end of one or more pictures, a set of motion characteristics is collected from the MB vectors supplied by the motion detector, such as size of motion vectors, distribution pattern of motion vectors, statistical data of motion vectors belonging to each group of MBs and the relationships between global motion vectors of sub-groups with the same group. These are used for determining which type of motion estimator is to be used to code the subsequent pictures(s). The validity period of each decision can be one picture or a plurality of picture(s), after which another decision will be made on another picture or plurality of pictures.

Figure 1:
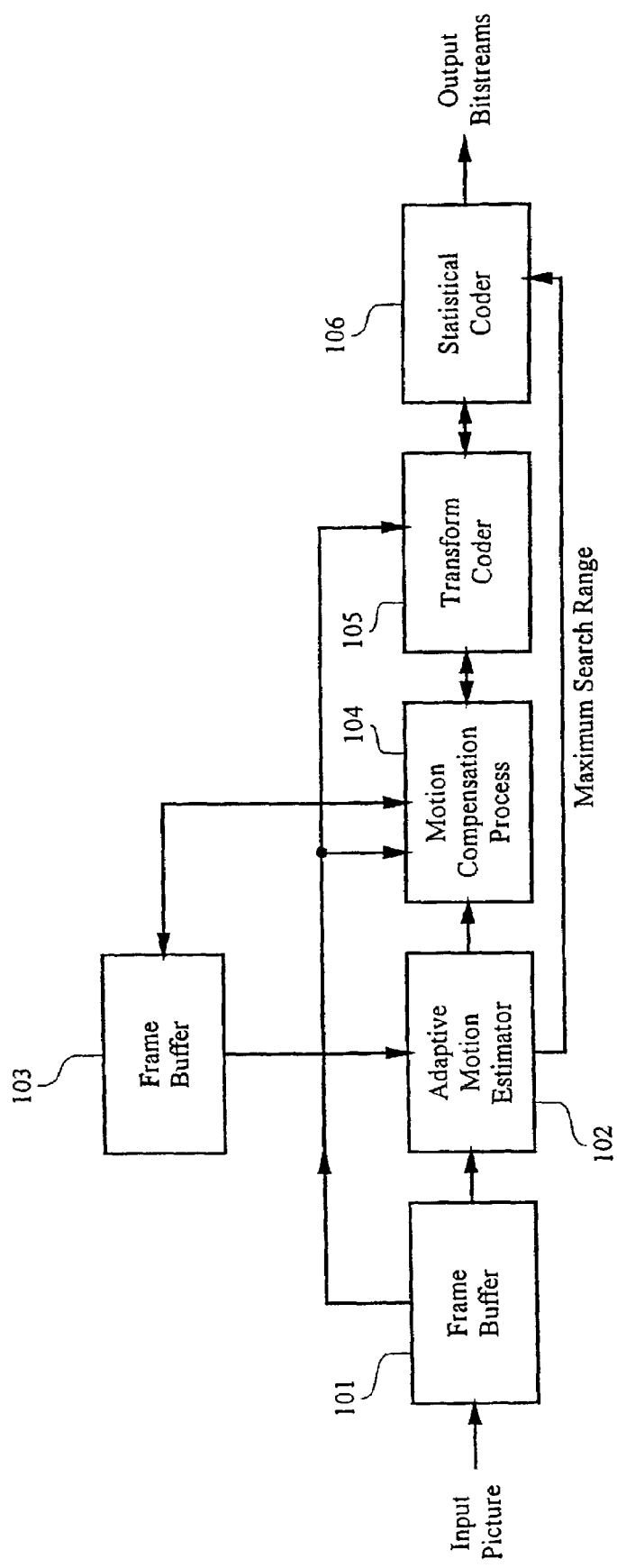
FIG. 1 is a functional block diagram of a video encoder with an adaptive motion estimator according to one embodiment of the present invention.

A video encoder with an adaptive motion estimator according to a preferred embodiment of the present invention is illustrated in block diagram form in FIG. 1. In the video encoder as shown, a moving picture sequence is input to a frame buffer 101 for recording and processing. The moving pictures sequence may be pre-processed in conventional ways before being received in the frame buffer 101.

A picture coding type (I, P or B-picture) is determined according to application needs for each picture in the input picture sequence. An I-picture is an intra-coded picture used mainly for random access or scene update. P-pictures use forward motion predictive coding with reference to a previously coded I or P picture (anchor picture), and B-pictures use forward and backward motion predictive coding with reference to previously coded I and/or P pictures. An input picture sequence may be either a field or frame structured sequence coming from an interlaced or progressive source.

Macroblocks containing blocks of pixel values are derived from a picture to be coded from the picture data stored in the frame buffer 101. The MBs are derived on a row by row basis starting from the leftmost MB to the rightmost MB, and the top row to the bottom row. MBs belonging to an I-picture are subjected to a transform coder 105 directly; and MBs belonging to a P-picture or B-picture are subjected to an adaptive motion estimator 102. It is also possible to subject MBs belonging to an I-picture to the adaptive motion estimator 102 for generation of error concealment motion vectors such as defined in the MPEG2 standard.

All necessary motion vectors, for example the frame and/or field, forward and/or backward, and 16×16/16×8/8×8 motion vectors, for each MB are detected by the adaptive motion estimator 102 by matching the MB to candidate blocks obtained from one or more search windows from a reference picture stored in a frame buffer 103. Different matching methods such as the exhaustive search method, the logarithmic search method, multi-steps or hierarchical search method, and search windows sizes and numbers may be utilised depending on application/implementation needs as well as the type of motion estimator selected within the adaptive motion estimator 102. Matching methods may also be implemented in various pixel resolutions, for example integer, half pel or quarter pel resolution. The matching criterion may be based on minimum of absolute errors, square errors, or other suitable distortion functions. A detailed description of one form of the adaptive motion estimator 102 is presented hereinbelow in connection with FIG. 2.

A motion compensation processor 104 is coupled to the adaptive motion estimator 102. In motion compensation process 104, a MB coding mode, such as intra-coding, frame/field forward/backward prediction, or frame/field interpolation, is first decided for each MB based on the detected motion vectors from the adaptive motion estimator 102. Necessary prediction errors are then generated based on the decided MB coding mode. An example of a MB coding mode decision may be found in the MPEG2 Test Model 5.

Macroblocks resulting from the motion compensation process 104 are then subjected to a transform coder 105 which exploits correlation within each MB and also its psychovisual effects. Examples of transform coders may be found in the aforementioned MPEG1, MPEG2, H.261 and H.263 standards. An embodiment of a transform coder 105 according to the MPEG2 Test Model 5 consists of a DCT, quantiser rate controller with adaptive quantisation, inverse quantiser, and inverse DCT. The transformed and quantised coefficients are inverse quantised and inverse transformed by the transform coder 105 to produce reconstructed MBs which are passed to the frame buffer 103 for future reference. Necessary inverse of motion compensation is also provided to each reconstructed MB by the motion compensation process 104. Reference pictures formed by the reconstructed MBs are used in the adaptive motion estimator 102 and motion compensation process 104. In some applications or coding instances, it is also possible to take input pictures directly as reference pictures for the adaptive motion estimator 102.

A statistical coder 106 is coupled to the transform coder 105, which exploits statistical redundancies in the received data, and multiplexes the results to produce the final compressed output bitstreams. As an example in the MPEG2 Test Model 5, the statistical coder 106 provides the zig-zag scanning and run-length encoding of the transformed and quantised coefficients, differential coding of the utilised motion vectors, and multiplexing of all results and necessary side information (e.g. sequence/GOP/picture/slice/MB layer header information, picture coding types, MB coding modes, etc.). The statistical coder 106 utilises variable length codes (VLC) from VLC tables.

Figure 2:
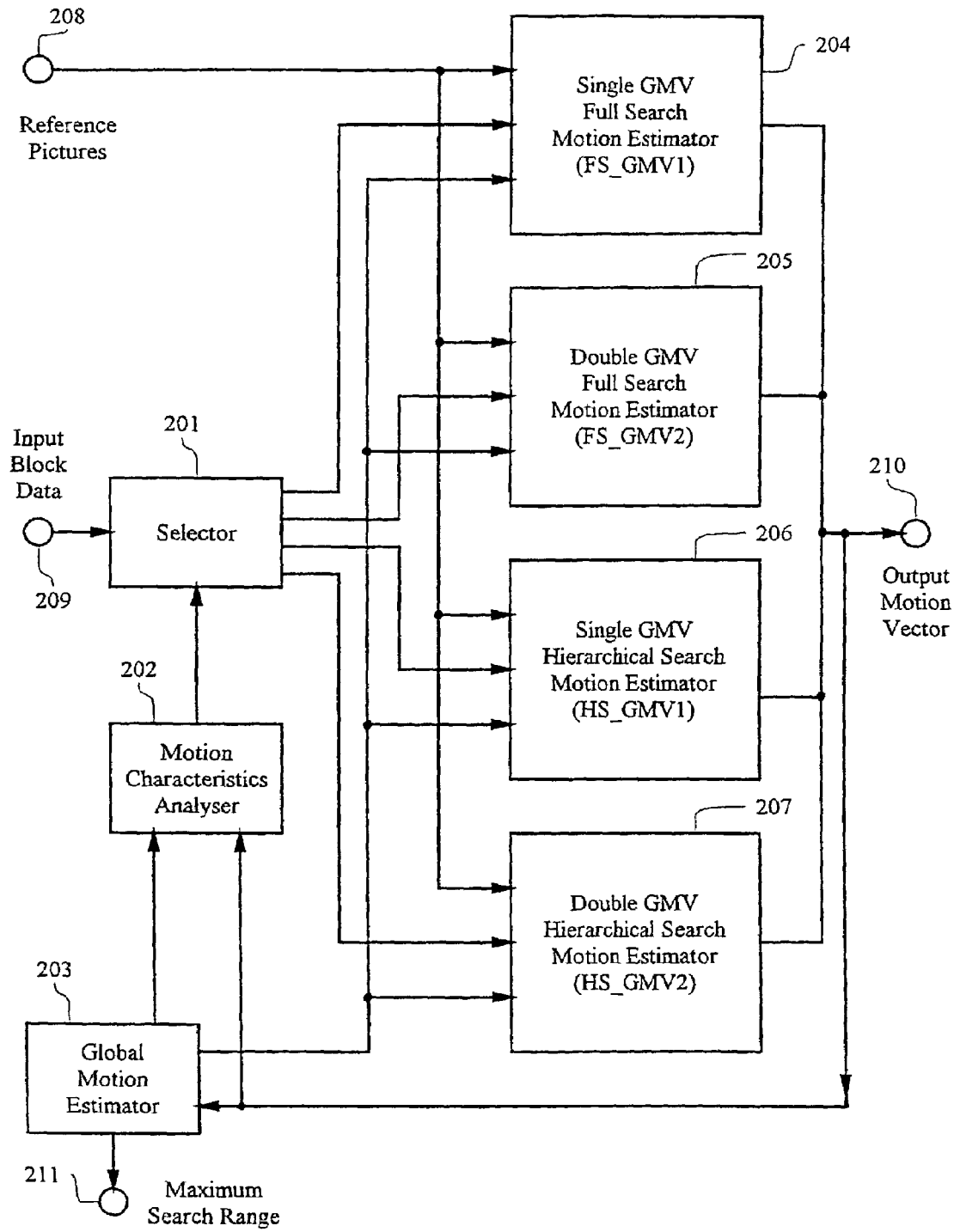
FIG. 2 is a functional block diagram of an adaptive motion estimator according to one embodiment of the present invention.

A functional block diagram of one form of the adaptive motion estimator 102 is illustrated in FIG. 2. The adaptive motion estimator of this embodiment has two inputs 208, 209 and two outputs 210, 211. Current picture data blocks are supplied to a selector 201 of the adaptive motion estimator from the frame buffer 101 at input 209. Reference picture data is provided from the reference picture frame buffer 103 at input 208 which is coupled to a plurality of motion estimators 204, 205, 206 and 207. The selector 201 also receives input from a motion characteristics analyser 202. The motion estimators 204, 205, 206, 207 are controlled by the selector so that a selected one of them produces an output to the motion vector output 210, which is provided to the motion compensation processor 104 (FIG. 1). The output motion vector is also fed back to a global motion estimator 203 and to the motion characteristics analyser 202. The global motion estimator 203 is coupled to provide data to the motion characteristics analyser and the motion estimators 204, 205, 206, 207. The global motion estimator 203 also produces a maximum search range output which is provided to the statistical coder 106 (FIG. 1).

The global motion estimator 203 determines one or more global motion vectors for each row of MBs from an input picture. In this particular embodiment, three global motion vectors are computed: one representing the average motion vector of the whole row, the other two global motion vectors representing two sub-groups of MBs from the row differentiated by some motion characteristics. For this embodiment, the two sub-groups are obtained by performing two-level vector quantisation on the MB motion vectors in the row. An example of a two-level quantisation process is illustrated in flow diagram form in FIG. 5.

Figure 5:
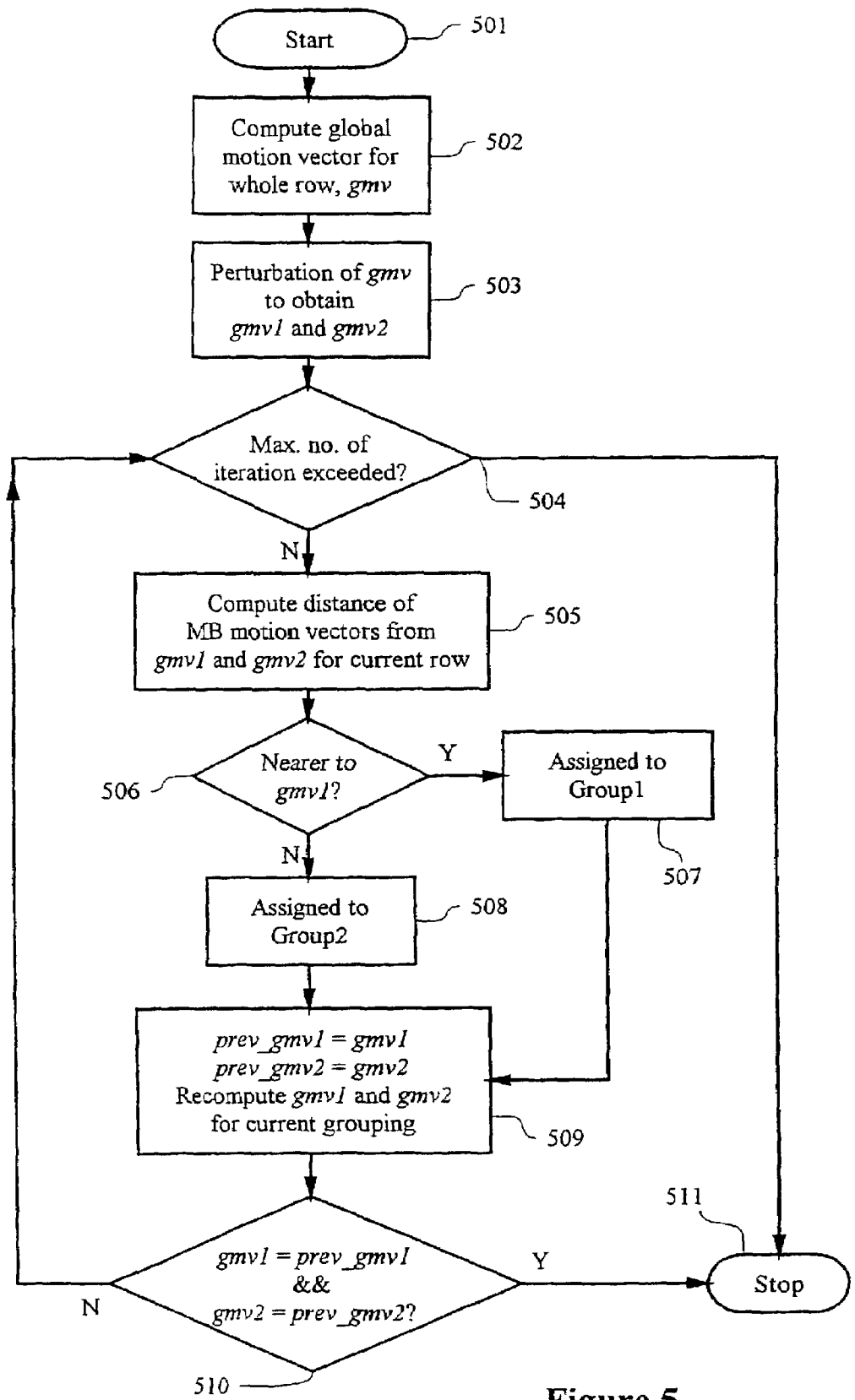
FIG. 5 is a flow-chart illustrating a particular example of how a group of motion vectors may be partitioned into sub-groups, according to one embodiment of the present invention.

Referring to FIG. 5 beginning at step 501, firstly a global motion vector gmv is computed by averaging the MB motion vectors in the current row (step 502). The global motion vector gmv is then perturbed at step 503 to obtain separate initial values for secondary motion vectors gmv1 and gmv2. The vector quantisation algorithm then enters an iteration loop beginning at step 504 whereby the distance of each of the MB motion vectors from gmv1 and gmv2 are being compared to separate the MB motion vectors into two groups, Group1 and Group2. The secondary motion vectors gmv1 and gmv2 are then re-computed from the motion vectors in the respective new group1 and group2. At step 504 a test is applied to determine if a preset maximum number of iterations has yet been reached. If the maximum number of iterations has been reached then the procedure ends at step 511 with the primary and secondary global motion vectors which have been computed. If the iteration number limit has not been reached, then the distances between each of the respective macroblock motion vectors and the secondary global motion vectors gmv1 and gmv2 are computed at step 505. At steps 506, 507 and 508, each of the MB motion vectors is determined to be closer to either gmv1 or gmv2. If the MB motion vector is closer to the current value of gmv1 then gmv2 then it is assigned to Group1, otherwise it is assigned to Group2. In the next step (509), the value of gmv1 is temporarily preserved in a register prev_gmv1 and the value of gmv2 is preserved in prev_gmv2, following which values for the gmv1 and gmv2 are recomputed according to the MB motion vectors allocated to the respectively to Group1 and Group2. The vector quantisation procedure then carries out another test at step 510 to determine whether to terminate the iteration loop. The test at step 510 involves a comparison of prev_gmv1 with recomputed gmv1 and prev_gmv2 with recomputed gmv2. If the previous and recomputed values of the secondary global motion vectors are within a small preset tolerance (i.e. the iteration loop leaves gmv1 and gmv2 essentially unchanged) then the procedure ends at step 511 with the computed global motion vectors gmv, gmv1 and gmv2. Thus, the process of distance comparison and group reassignment continues until the value of gmv1 and gmv2 remains unchanged, or the maximum number of iterations allowed is reached.

Figure 3:
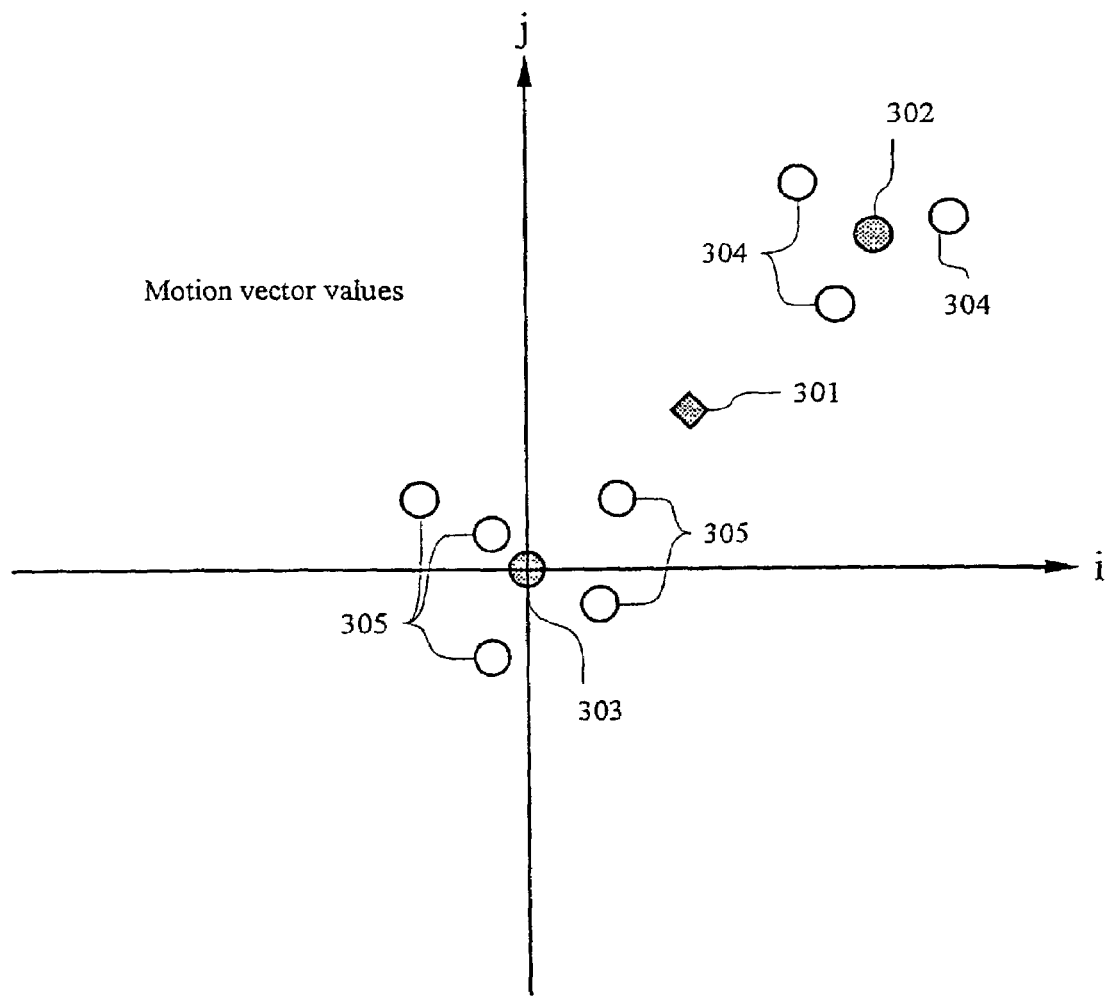
FIG. 3 illustrates the outcome of performing a vector quantisation on a group of MB motion vectors according to one embodiment of the present invention.

An example of a distribution of MB motion vectors is illustrated in FIG. 3, for the case of eight MB motion vectors in a row. In this Figure, plain circles represent the placement of individual macroblock motion vectors in the row. The primary global motion vector which constitutes the combination of all of the individual MB motion vectors is indicated by the symbol at 301. The vector quantisation procedure determines two groupings of MB motion vectors, the first group (Group1) comprising the motion vectors labelled as 304 and the second group (Group2) being the motion vectors labelled 305. The secondary global motion vectors gmv1 and gmv2 are respective averages of the motion vectors from Group1 and Group2, and are indicated in the Figure at 302 and 303. This Figure graphically illustrates the relationships between the eight MB vectors, the global motion vector 301 representing the whole row (gmv), and the two secondary global motion vectors 302 and 303 representing the two sub-groups (gmv1 and gmv2) are as shown. Note that as an alternative to using vector average, other functions may be used to represent each of the groups, such as a median function, most common vector, etc.

Figure 4:
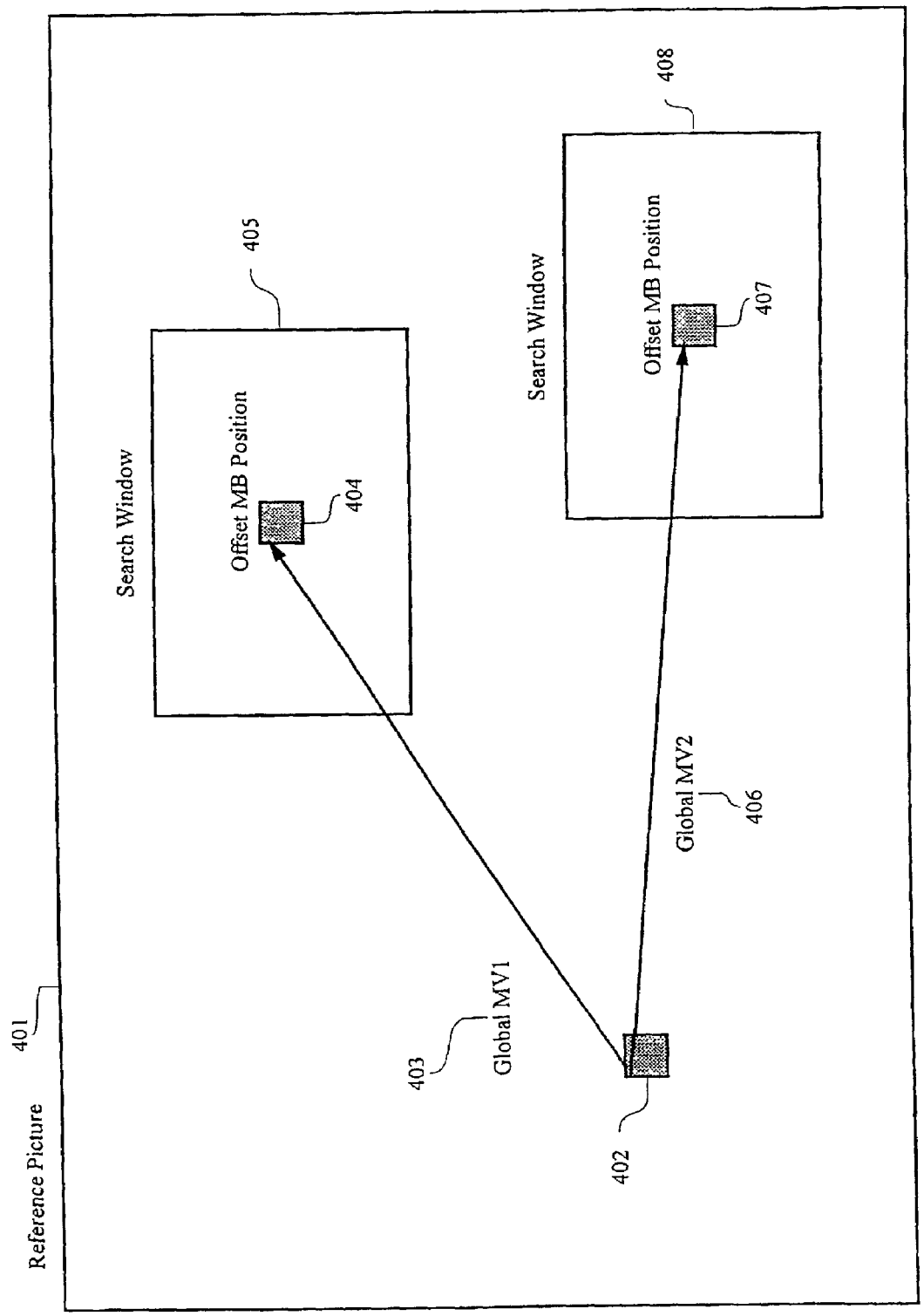
FIG. 4 illustrates how multiple search windows are defined by global motion vectors within a reference picture according to the present invention.

The calculated global motion vectors are used in subsequent picture(s) to offset the search window(s). This is diagrammatically illustrated in FIG. 4 for the case of two global motion vectors per row. The first search window for a current MB to be coded is determined from a reference picture 401 by first determining the position of a co-sited macroblock 402 on the reference picture 401. The position of the macroblock 402 is offset according to the first global motion vector 403 generated for the MB row to which the current MB belongs. This results in a new offset MB position 404 as illustrated. Then, the horizontal and vertical search ranges are included, centred around the offset MB position 404, to form the search window 405 for the current MB. The search window 405 is used for motion vector detection for the current MB. The same procedure is carried out for the second global motion vector 406 to obtain the offset MB 407 and search window 408. The two best macroblock matching predictions obtained from the two search windows are compared and the one giving the best prediction is chosen, with the corresponding MB motion vector assigned to the current MB. If only one global motion vector is used (depending on the type of motion estimator chosen), then the procedure illustrated previously for the first search window is carried out.

As mentioned earlier, different matching methods such as the exhaustive search method, the logarithmic search method, multi-step or hierarchical search method, and search windows in different sizes and numbers may be utilised. Referring again to FIG. 2, in this embodiment four different motion estimation schemes are considered, labelled FS_GMV1, FS_GMV2, HS_GMV1, and HS_GMV2 in the motion estimator blocks 204, 205, 206 and 207 respectively. All of the motion estimators 204, 205, 206, 207 are coupled to the global motion estimator 203 to obtain global motion vector(s) to offset the search window, but the motion estimators differ in terms the type of block-matching technique employed and number of global motion vectors used. For example, FS_GMV1 uses one global motion vector and an exhaustive search block-matching technique. This technique gives the best accuracy among the three, but gives the smallest search range/area given the same amount of computational processing. FS_GMV2 uses two global motion vector and an exhaustive search blocking matching technique. This method is useful when there are two groups of motion within the pictures; it gives more accurate results than HS_GMV2 but requires much more computation (e.g. more hardware) for a meaningful and effective search range. HS_GMV1 uses one global motion vector but a hierarchical search block-matching technique followed by multi-step refinements. This gives a good trade off between accuracy and area of coverage. Therefore the search range/area can be a few times larger than that of FS_GMV1 (given the same hardware) depending on the amount of sub-sampling done on the picture. HS_GMV2 uses two global motion vectors and a hierarchical search block-matching plus multi-step refinement technique. This method gives better performance when there are significant difference in foreground/background motion.

The selector 201, together with the motion characteristics analyser 202 are responsible for deciding which of the schemes is to be used, at picture level, based on the motion characteristics of past pictures. The motion characteristics analyser 202 is fed with motion vector information from the global motion estimator 203 and the output of one of the motion estimators 204 to 207 (depending on which one was selected for the current picture). From this information, some metrics representing the distribution pattern of motion vectors in the picture are extracted, such as the distance between each sub-group of motion vectors, the magnitude of group/sub-group global motion vectors, etc. These metrics are passed to the selector 201 for evaluation after which a decision will be made on which motion estimator to use for subsequent picture(s). In this exemplary embodiment, only motion estimators FS_GMV1 (204), HS_GMV1 (206) and HS_GMV2 (207) are used. The FS_GMV2 motion estimator 205 is excluded in this case to keep the hardware size small, it can be included (and will give very good results) if hardware is expanded sufficiently for the FS_GMV2 motion estimator to have a meaningful and effective search range.

Since correlation of the current picture and pictures in its vicinity is high in the absence of scene changes, the type of motion estimation scheme selected is often suitable for pictures in the vicinity of the current picture. For this particular embodiment, the assignment scheme is such that if one of the schemes, say FS_GMV1, is associated with a particular picture (say picture N), then those pictures that used global motion vectors derived from picture N will also use FS_GMV1 for the motion vector detection process in adaptive motion estimator 102.

Figure 6:
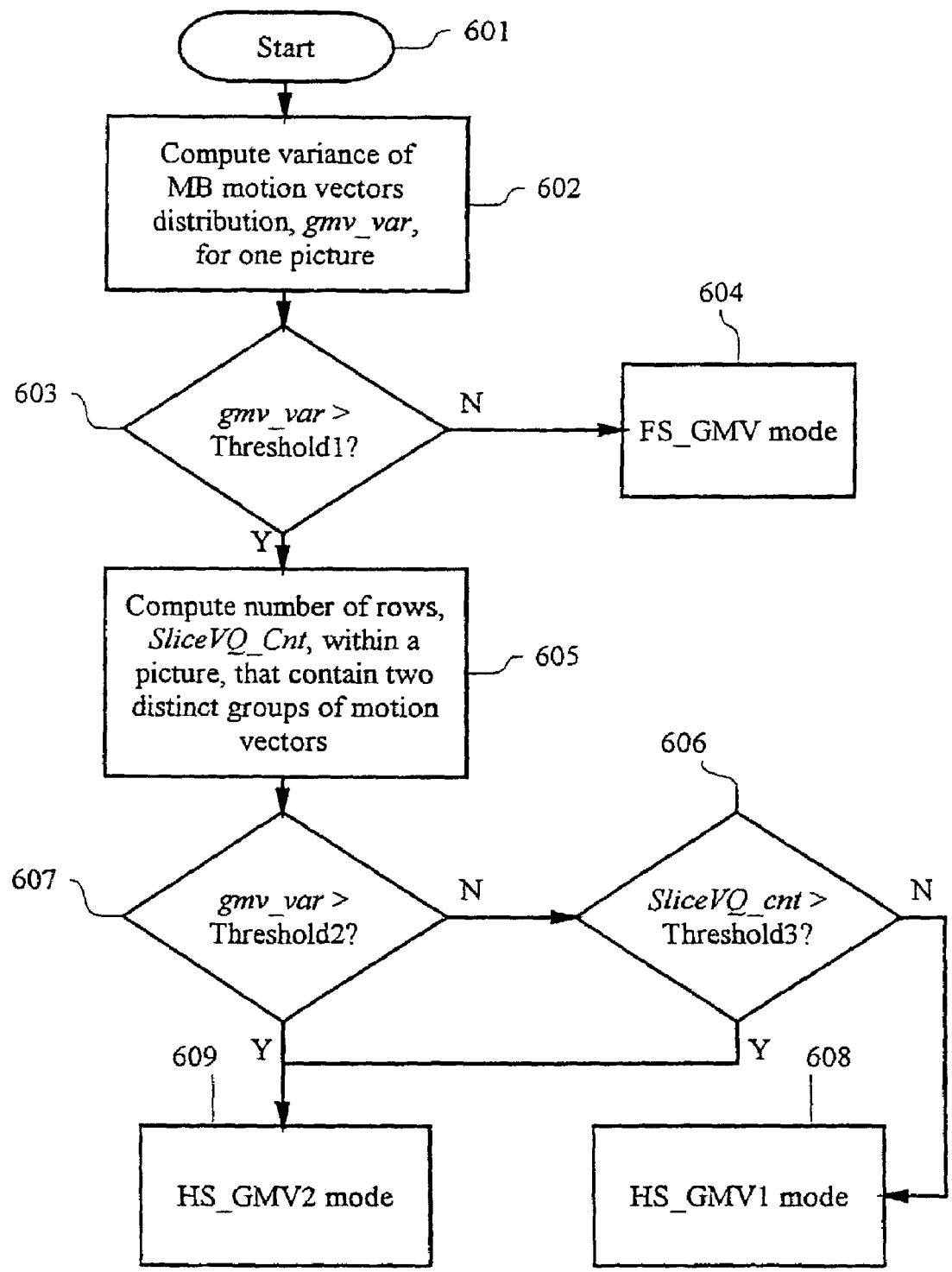
FIG. 6 is a flow-chart illustrating a particular example of the motion characteristics extraction, evaluation process for deciding which motion estimator to use, according to one embodiment of the present invention.

One example of the motion characteristics analysis, evaluation and motion estimator selection process used in this embodiment is illustrated in flow diagram form in FIG. 6, beginning with step 601. The distances of the MB motion vectors from their corresponding global motion vectors are first computed and their average value, gmv_var, obtained for the picture (step 602). The value of gmv_var is a measure of compactness of the distribution of motion vectors. Note that other metrics that measure the compactness of a group of values can also be used, for example the variance of MB motion vectors about their global motion vector. The value of gmv_var is compared to a certain preselected threshold, threshold1, (step 603) and if the gmv_var is smaller than threshold1 then the motion estimator FS_GMV1 scheme is selected (step 604). If the value of gmv_var is determined to be larger than threshold1 at step 603 then another metric measuring how far apart two distinct groups of MB vectors in a row is computed (step 605). This basically divides the MB motion vectors in a row into two sub-groups using the two-level vector quantisation and measuring the distance between the two global motion vectors representing the groups. A count of how many rows in the picture contain distinctly far apart sub-groups of motion vectors is obtained and compared to another predetermined threshold, thresholds, at step 606. The result of this comparison, together with another comparison of gmv_var against a second threshold, threshold2, (step 607) determines whether the strategy HS_GMV1 (step 608) or HS_GMV2 (step 609) will be selected.

It will be appreciated from the foregoing detailed description that embodiments of the present invention provide improved methods and apparatus for motion vector detection in a video data encoder. A motion estimator controller is used to select from among a set of motion estimators the most suitable one for a segment consisting of one or more pictures.

Selection is based on the motion characteristics of past pictures. The controller is therefore able to adaptively choose the motion estimator that gives the best trade off in terms of accuracy and area of coverage, given a certain fixed hardware complexity. All of these features enable increases in the performance of the encoder, and enable it to provide high accuracy motion estimation for slow moving sequences while still having the ability to cover fast moving sequences that require large search range/areas. Embodiments of the invention also allow adaption of the VLC tables to the different search range selected, resulting in a more efficient bit allocation to the coding of motion vectors.

Embodiments of the present invention also reduce the computational complexity and improves the performance of the encoder by using a global motion estimator with multiple search windows. This enables better prediction of pictures containing not just translational, but also zooming, sheer and multiple clusters of different foreground/background motion. With a fixed global motion vector, the hardware (e.g. search window cache) required for a large search range/area implementation is greatly reduced.

It will be readily understood by those skilled in the art that the invention described herein can be practically implemented in a number of different ways. For example, the principles of the invention can be incorporated in an integrated circuit for encoding/decoding video data, in which case the functions of the invention may be embodied in the circuit design, firmware, microcode or the like. The invention may just as easily be implemented on general purpose data processing apparatus, in which case the functions of the invention may be embodied in a sequence of computer software instructions.

The foregoing detailed description of the preferred embodiments has been presented by way of example only, and is not intended to be considered limiting to the scope of the present invention which is defined in the claims appended hereto.

The invention claimed is:

1. A method for encoding moving pictures data from a sequence of moving pictures in which each picture in the sequence is represented by a plurality of data blocks corresponding to non-overlapping areas of the picture, the method comprising:

for each picture:
  selecting a group of related data blocks from the plurality of data blocks of the picture;
  for each data block in the selected group, obtaining a corresponding block motion vector from a previously processed picture in the moving pictures sequence;
  determining a plurality of global motion vectors for the selected group, each of the global motion vectors being formed from a plurality of the corresponding block motion vectors;
  analyzing the global motion vectors and determining a metric representing the distribution pattern thereof;
for a first one of the pictures:
  selecting a first motion estimator scheme on the basis of the distribution pattern metric for the first picture, the first motion estimator scheme being selected from amongst a plurality of motion estimator schemes each having a different combination of block matching search methods and numbers of global motion vectors, wherein the first motion estimator scheme includes a first block-matching search method that is one of exhaustive search methods, logarithmic search methods, hierarchical search methods and multi-step search methods;
  performing data block-matching with a reference picture using the first motion estimator scheme to generate a block motion vector for the first picture; and encoding the picture data including the block motion vectors for the first reference picture; and
for a second one of the pictures:
  selecting a second motion estimator scheme on the basis of the distribution pattern metric for the second picture, the second motion estimator scheme being selected from amongst the plurality of motion estimator schemes each having a different combination of block-matching search methods and numbers of global motion vectors, wherein the second motion estimator scheme includes a second block matching search method, different form the first block-matching search method, that is one of exhaustive search methods, logarithmic search methods, hierarchical search methods, and multi-step search methods;
  performing data block-matching with a reference picture using the second motion estimator scheme to generate a block motion vector for the second picture; and
  encoding the picture data including the block motion vectors for the second picture;
  selecting a motion estimator scheme on the basis of the distribution pattern metric, the motion estimator scheme being selected from amongst a plurality of motion estimator schemes each having a different combination of block-matching search methods and numbers of global motion vectors, wherein the different combinations include a plurality of block matching search methods.

2. A method as claimed in claim 1 including a step of determining, at the end of processing of a particular picture, a maximum search range using all of the global motion vectors determined for the picture, and selecting a variable length coding scheme in accordance with the maximum search range for encoding the block motion vectors for the picture.

3. A method as claimed in claim 1, wherein the determining step includes classifying the block motion vectors from the selected group into a plurality of sub-groups; determining a primary global vector corresponding to all the block motion vectors from the selected group; and determining a plurality of secondary global motion vectors corresponding to the respective sub-groups from the block motion vectors classified in the respective sub-groups; wherein the selecting step includes:
  selecting the primary and/or at least one of the secondary global motion vectors for use in defining one or more search windows for each block in the selected group to enable block matching with a reference picture.

4. A method as claimed in claim 1, further comprising:
  determining a match between each block in the selected group and a matching-block in the one or more search windows for that block in the reference picture;
  determining a computed motion vector between each block in the selected group and its matching block;
  generating a computed motion vector for each block in the picture;
  determining a maximum offset vector from the largest of the computed motion vectors; and
  using the maximum offset vector to select a variable length coding level for the computed motion vectors for the picture.

5. A moving pictures encoder for encoding a sequence of pictures each comprising a plurality of data blocks, including an adaptive data block matching apparatus comprising:
  a global motion estimator coupled to receive block motion vectors for data blocks of a previously processed picture with respect to a reference picture for generating a plurality of global motion vectors for the picture, each global motion vector being generated from a plurality of block motion vectors from a respective group of related blocks in the picture;

a motion characteristics analyzer coupled to receive the global motion vectors from the global motion estimator for analyzing the global motion vectors to determine a metric representing a distribution pattern thereof;

a selector coupled to receive the distribution pattern metric from the motion characteristics analyzer for selecting a motion estimation scheme from amongst a plurality of motion estimation schemes, for data block matching of at least one subsequent picture in the sequence, each of the plurality of motion estimation schemes having a different combination of data block matching techniques and numbers of global motion vectors; and a plurality of motion estimators controlled by said selector and coupled to receive said global motion vectors for performing data block matching of at least one subsequent picture in the sequence using the selected motion estimation scheme, said global motion vectors and preselected search window characteristics, wherein the plurality of motion estimators includes a first motion estimator configured to use one of the received global motion vectors and employ an exhaustive search block-matching technique, a second motion estimator configured to use two of the received global motion vectors and employ an exhaustive search block-matching technique, a third motion estimator configured to use one of the received global motion vectors and employ a hierarchical search block-matching technique, and a fourth motion estimator configured to use two of the received global motion vectors and employ a hierarchical search block-matching technique.

6. A moving pictures encoder as claimed in claim 5, wherein the global motion estimator includes means for determining a maximum search range on the basis of the global motion vectors.

7. A moving pictures encoder as claimed in claim 6, including a statistical coder employing variable length codes, and wherein the statistical coder is coupled to the global motion estimator to receive said maximum search range, and wherein the statistical coder selects a variable length coding scheme for block motion vectors of a picture on the basis of said maximum search range.

8. A moving pictures encoder as claimed in claim 5, wherein the global motion estimator includes:

means for classifying the block motion vectors from a selected group into a plurality of sub-groups;

means for determining a primary global vector from all the block motion vectors from the selected group; and means for determining a plurality of secondary global motion vectors corresponding to the respective sub-groups from the block motion vectors classified in the respective sub-groups; and wherein the selector includes:

means for selecting the primary and/or at least one of the secondary global motion vectors for use in defining one or more search windows for each block in the selected group to enable block matching with a reference picture.

9. A moving pictures encoder as claimed in claim 5, wherein at least one of the motion estimators includes:

means for determining a match between each block in the selected group and a matching-block in the one or more search windows for that block in the reference picture;

means for determining a computed motion vector between each block in the selected group and its matching block; and means for generating a computed motion vector for each block in the picture and determining a maximum offset vector from the largest of the computed motion vectors, and using the maximum offset vector to select a variable length coding level for the computed motion vectors for the picture.

* * * * *